United States Patent
Hiranuma et al.

(10) Patent No.: US 10,840,800 B2
(45) Date of Patent: Nov. 17, 2020

(54) POWER CONVERSION DEVICE

(71) Applicant: HITACHI AUTOMOTIVE SYSTEMS, LTD., Hitachinaka-shi, Ibaraki (JP)

(72) Inventors: Satoshi Hiranuma, Hitachinaka (JP); Koichi Yahata, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 195 days.

(21) Appl. No.: 16/069,754

(22) PCT Filed: Jan. 10, 2017

(86) PCT No.: PCT/JP2017/000361
§ 371 (c)(1),
(2) Date: Jul. 12, 2018

(87) PCT Pub. No.: WO2017/130668
PCT Pub. Date: Aug. 3, 2017

(65) Prior Publication Data
US 2019/0020263 A1    Jan. 17, 2019

(30) Foreign Application Priority Data
Jan. 29, 2016    (JP) .................................. 2016-015031

(51) Int. Cl.
*H02M 1/32* (2007.01)
*H02M 1/08* (2006.01)
(Continued)

(52) U.S. Cl.
CPC ............. *H02M 1/32* (2013.01); *H02J 7/0068* (2013.01); *H02J 9/061* (2013.01); *H02M 1/08* (2013.01);
(Continued)

(58) Field of Classification Search
CPC ............ H02M 1/32; H02M 1/08; H02M 7/48; H02M 7/5387; H02M 7/53875; H02J 7/0068; H02J 9/061
(Continued)

(56) References Cited

U.S. PATENT DOCUMENTS

| | | | | |
|---|---|---|---|---|
| 2010/0148805 A1* | 6/2010 | Imhoff | ...................... | B61L 1/20 |
| | | | | 324/678 |
| 2012/0235613 A1* | 9/2012 | Huang | .................. | B60L 3/0092 |
| | | | | 318/400.26 |
| 2016/0280072 A1* | 9/2016 | Okamura | .............. | B60L 3/0061 |

FOREIGN PATENT DOCUMENTS

| | | |
|---|---|---|
| JP | 2014-158399 A | 8/2014 |
| JP | 2014-192975 A | 10/2014 |

(Continued)

OTHER PUBLICATIONS

International Search Report and English translation and Written Opinion issued in corresponding application No. PCT/JP2017/000361 dated Mar. 14, 2017.

*Primary Examiner* — Michael R. Fin
(74) *Attorney, Agent, or Firm* — Foley & Lardner LLP

(57) ABSTRACT

Circuit configurations become complicate as a power circuit is expanded, and switching elements are necessarily controlled using invert circuits even when an inverter operates normally. A drive circuit 911 monitors soundness of a gate power circuit 10. When a voltage value P3 is less than a predetermined threshold, the drive circuit determines that a failure occurs in the gate power circuit 10, and outputs a signal P4 to a controller 6. After receiving the signal P4, the controller 6 outputs a signal to a signal line S1 to operate a photovoltaic coupler of a power supply circuit 92. Then, the MOS transistor T1 in the battery circuit 93 enters a conduction state. The charges accumulated in the capacitor C1 are immediately accumulated to the gate electrode of the switch- (Continued)

ing element 81 to turn on the switching element 81. In addition, the charges discharged from the capacitor C1 are charged from the photovoltaic coupler.

11 Claims, 3 Drawing Sheets

(51) Int. Cl.
*H02M 7/48* (2007.01)
*H02M 7/5387* (2007.01)
*H02J 7/00* (2006.01)
*H02J 9/06* (2006.01)
*H02P 27/08* (2006.01)

(52) U.S. Cl.
CPC ........... *H02M 7/48* (2013.01); *H02M 7/5387* (2013.01); *H02M 7/53875* (2013.01); *H02P 27/08* (2013.01); *Y02E 10/56* (2013.01)

(58) Field of Classification Search
USPC .......................................................... 307/19
See application file for complete search history.

(56) References Cited

FOREIGN PATENT DOCUMENTS

| | | |
|---|---|---|
| JP | 2015-115977 A | 6/2015 |
| JP | 2015-159684 A | 9/2015 |

\* cited by examiner

POWER CONVERSION DEVICE

TECHNICAL FIELD

The present invention relates to a power conversion device.

BACKGROUND ART

In a power conversion device which includes an inverter formed as a bridge circuit in which switching elements consist of upper and lower arms, there is known an inverter which enters a conduction state when at least one of the switching elements of the lower arm is not applied with a power source voltage to prevent an overvoltage at the time of failure. PTL 1 discloses an inverter device in which normally-OFF switching elements are used for the upper and lower arms, and the switching elements of the lower arm are turned on when the power source voltage is lost.

CITATION LIST

Patent Literature

PTL 1: JP 2014-192975 A

SUMMARY OF INVENTION

Technical Problem

In the circuit configuration disclosed in PTL 1 described above, an invert circuit must be used in a normal operation of the inverter to control the switching elements. Therefore, the circuit configuration is complicated.

Solution to Problem

A power conversion device according to the present invention includes: an inverter circuit which is configured by a switching element, inputs a DC voltage, and outputs an AC voltage; a gate drive circuit which outputs a drive signal to drive the switching element; a gate power circuit which supplies a gate power voltage to the gate drive circuit to output the drive signal; and a battery circuit which accumulates charges to turn on the switching element, wherein the battery circuit accumulates the charges by the gate power voltage in a case where the gate power circuit is in a normal state, and supplies the charges to the switching element to turn on the switching element in a case where the gate power circuit is in an abnormal state.

Advantageous Effects of Invention

According to the present invention, it is possible to provide a power conversion device which can cope with a loss of the power source voltage without making a circuit configuration complicated.

DESCRIPTION OF EMBODIMENTS

Figure 1:
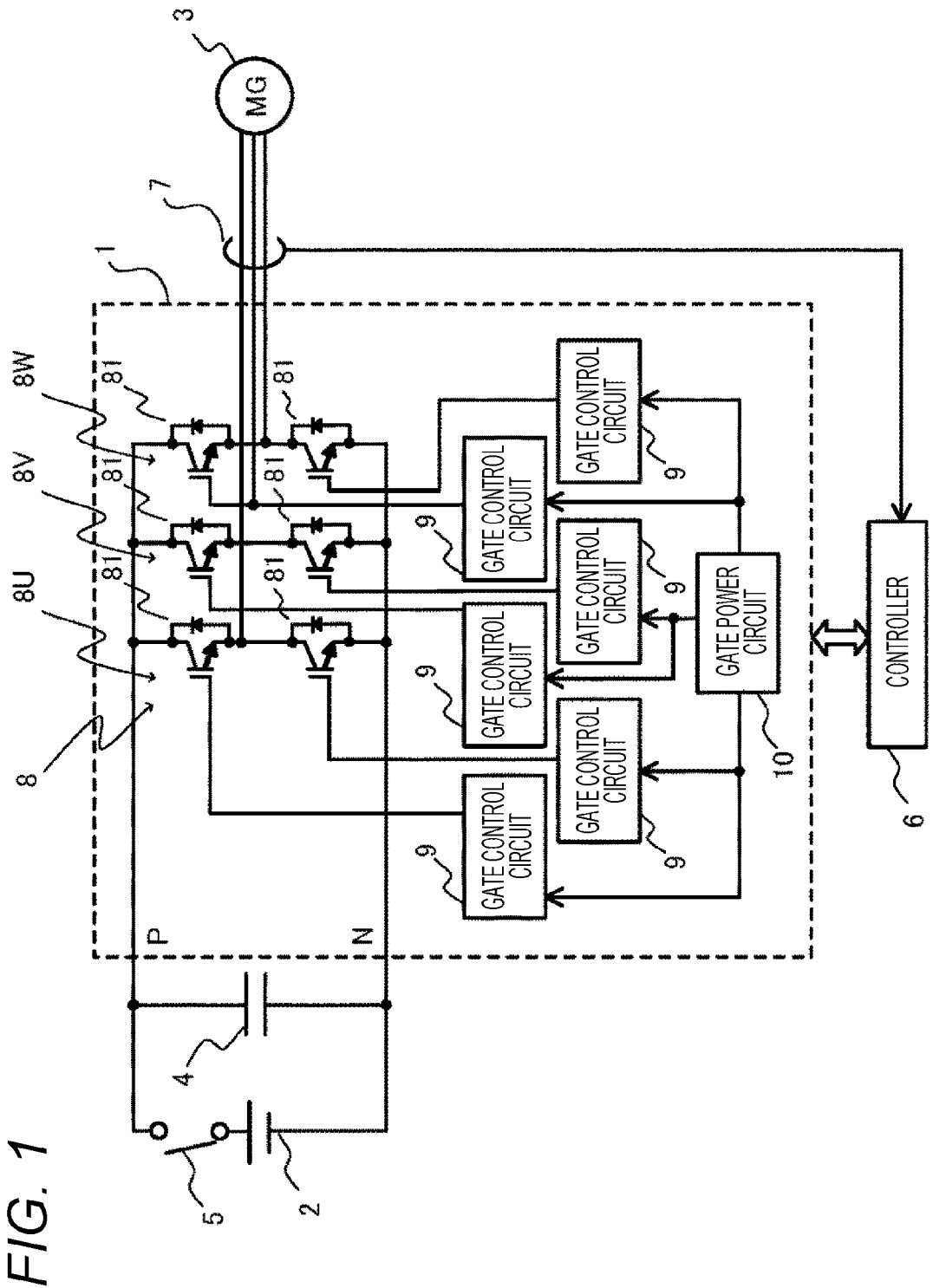
FIG. 1 is a circuit diagram of a power conversion device.

FIG. 1 is a circuit diagram of a power conversion device according to an embodiment of the present invention. A power conversion device 1 is a motor generator 3 which converts a DC voltage received from a battery 2 into an AC voltage. The motor generator 3 is used for various power sources of a vehicle such as an electric vehicle and a hybrid vehicle. A capacitor 4 is connected to the battery 2 in parallel, and smoothens a voltage varying at the time of power conversion. A contactor 5 is used to connect or disconnect the battery 2 with respect to the power conversion device 1. The connection/disconnection of the contactor 5 is controlled by a controller 6, and is opened or closed by a contactor open/close signal from the controller 6.

A current sensor 7 detects three-phase current values which drive the motor generator 3, and outputs the current values to the controller 6. The controller 6 supplies a PWM (pulse width modulation) signal to the power conversion device 1 such that the motor generator 3 has a desired torque and a rotation frequency on the basis of the current value from the current sensor 7.

The power conversion device 1 includes an inverter circuit 8, a gate control circuit 9, and a gate power circuit 10. The inverter circuit 8 is configured by 3-phase bridge switching elements 81. Upper/lower arm series circuits 8U, 8V, and 8W, each of which is configured by two the switching elements 81, are provided in correspondence with U, V, and W phases. The upper/lower arm series circuits 8U, 8V, and 8W are electrically connected to a positive line P and a negative line N respectively.

Six gate control circuits 9 are provided to drive the 3-phase bridge switching elements 81 of the inverter circuit 8. The gate power circuit 10 supplies a gate power voltage to the respective gate control circuits 9 required to make the switching elements 81 turned on.

Figure 2:
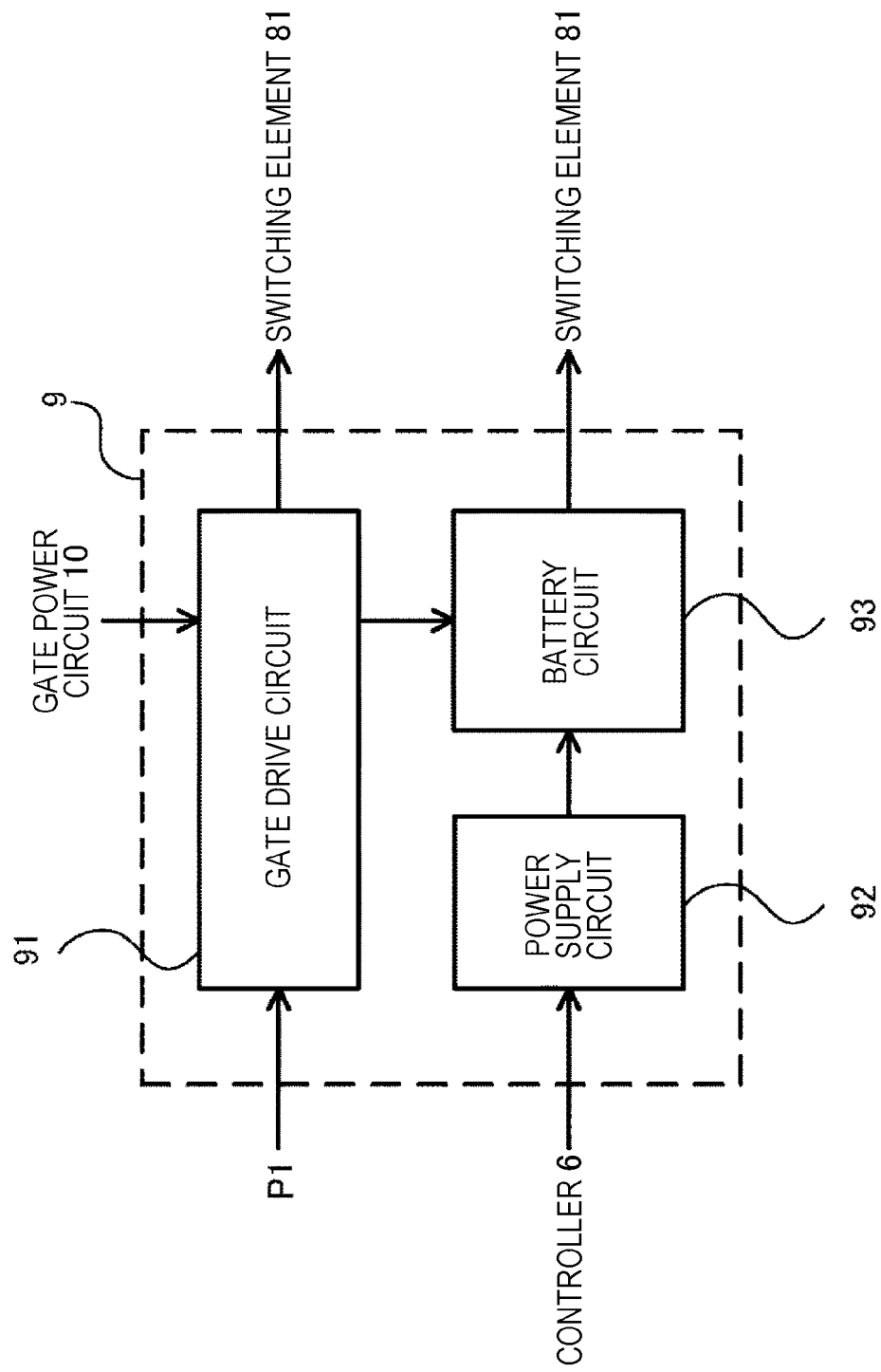
FIG. 2 is a circuit diagram of a gate control circuit.

FIG. 2 is a circuit diagram of the gate control circuit 9. Each gate control circuit 9 includes a gate drive circuit 91, a power supply circuit 92, and a battery circuit 93. The gate drive circuit 91 performs a switching control on the switching element 81 of the inverter circuit 8 on the basis of a PWM (pulse width modulation) signal P1 from the controller 6. In other words, in a case where the lower arm is driven, the gate drive circuit 91 insulates and amplifies the PWM signal of the lower arm using the gate power voltage supplied from the gate power circuit 10, and outputs the PWM signal to the gate electrode of the switching element 81 of the lower arm as a drive signal. Similarly, in a case where the upper arm is driven, the gate drive circuit insulates and amplifies the PWM signal of the upper arm using the gate power voltage supplied from the gate power circuit 10, and outputs the PWM signal to the gate electrode of the switching element 81 of the upper arm as a drive signal. With this configuration, the switching element 81 is switched on the basis of the input drive signal.

While the details will be described below, the power supply circuit 92 supplies a voltage to the battery circuit 93 according to a signal output from the controller 6 in a case where the gate power circuit 10 becomes abnormal. The battery circuit 93 is normally charged by the gate power voltage supplied from the gate power circuit 10. In a case where the gate power circuit 10 becomes abnormal, the battery circuit 93 discharges the charged power in response to the voltage supplied from the power supply circuit 92. With this configuration, the gate of the switching element 81 is charged, and the switching element 81 is turned on.

Herein, a case where a vehicle mounted with the motor generator 3 is towed will be described. In general, in a situation where a vehicle is towed, the contactor 5 is turned off. Idling happens to the motor generator 3 in a state where the inverter circuit 8 is apart from the battery 2. In a case where a synchronous motor is used as the motor generator 3, the terminal of the motor generator 3 generates an induced voltage when a magnetic flux generated from a rotor with a magnet is crossed with a winding of a stator.

In a case where the vehicle is towed, the induced voltage is generated in a 3-phase open mode in which all the switching elements 81 of the inverter circuit 8 are turned off. An induced current passes through a diode of the switching element 81, charges the smoothing capacitor 4, and increases the voltage. Since the induced voltage is proportional to the rotational frequency, the terminal voltage of the motor generator 3 becomes high in a case where the vehicle is towed at a high speed. Therefore, there is a possibility that the voltage exceeds a breakdown voltage of the capacitor 4 or the components in the power conversion device 1 such as the switching element 81.

Therefore, in general, the electric breakdown voltage of the power conversion device 1 is necessarily designed to be equal to or less than a maximum induced voltage of the motor generator 3. However, the torque necessary for the vehicle and the maximum current passing through the inverter circuit 8 are balanced, so that the output of the motor magnet may be designed to be high by lowering the energizing current. In this case, the induced voltage becomes high, and the above problem occurs.

Therefore, there may be employed a method in which the power conversion device 1 is activated at the time of towing the vehicle, and all the phases of the upper arm or the lower arm of the inverter circuit 8 are turned on by the controller 6 so as to set the motor generator 3 to a 3-phase short mode in order for the induced voltage of the motor generator 3 not to charge the capacitor 4. However, the inverter circuit 8 is necessarily activated at the time of towing the vehicle. Therefore, in a case where the gate power circuit 10 enters an abnormal state due to an accident or the like and thus is not activated, the switching element 81 cannot be turned on, and thus the inverter circuit 8 cannot be shifted to the 3-phase short mode. For this reason, the vehicle is necessarily towed at a low speed in order to prevent that the vehicle cannot be towed or the induced voltage is not increased. In this embodiment, as described in the following, the motor generator 3 can be shifted to the 3-phase short mode even in a case where the gate power circuit 10 is abnormal due to an accident or the like.

Figure 3:
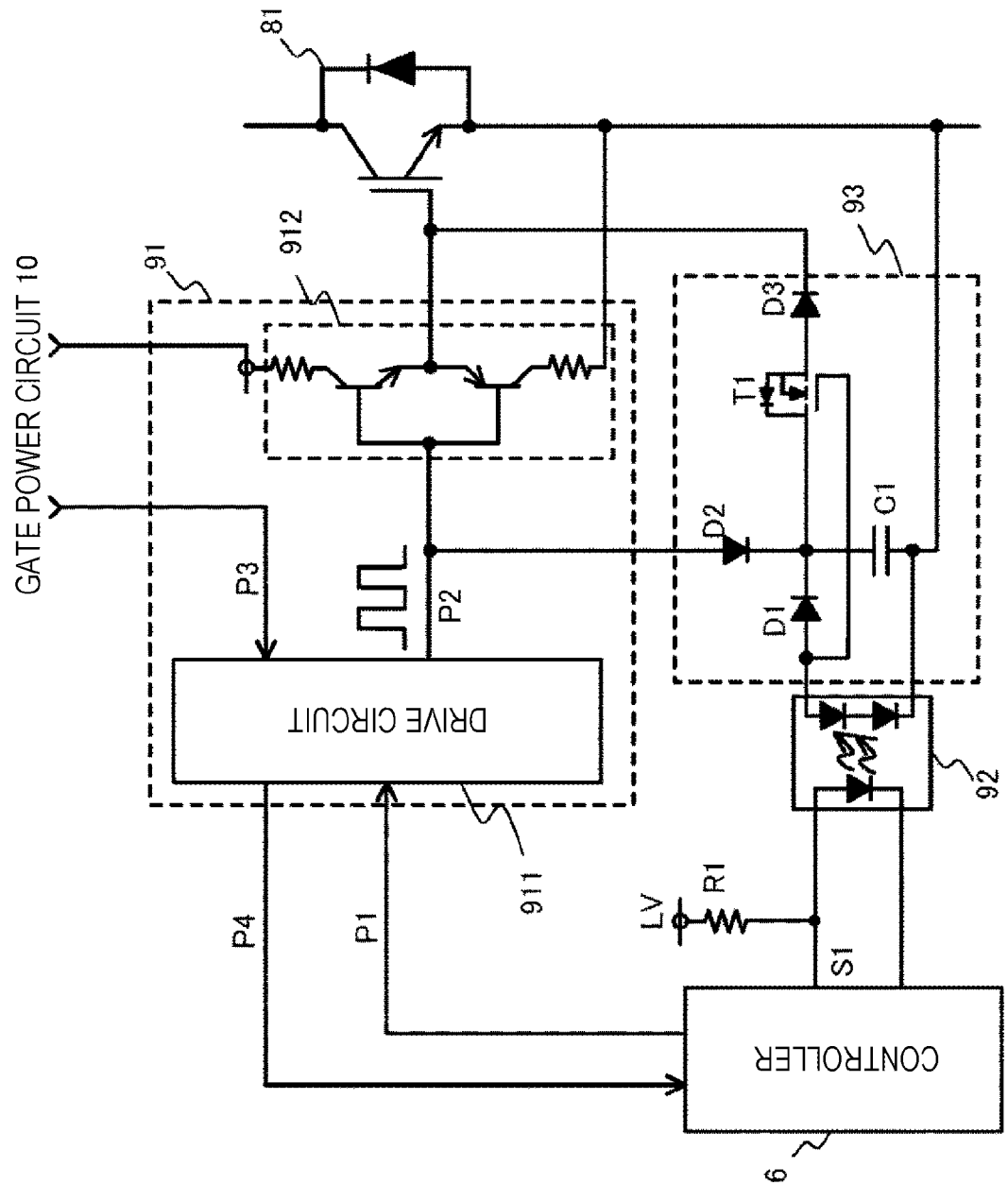
FIG. 3 is a circuit diagram illustrating part of the power conversion device in detail.

FIG. 3 is a circuit diagram illustrating part of the power conversion device 1 in this embodiment. The controller 6 supplies the PWM signal P1 to a drive circuit 911 of the gate drive circuit 91. The drive circuit 911 is configured by a gate driver IC. A signal P2 output from the drive circuit 911 is input to the gate terminal of a transistor of a buffer circuit 912. The buffer circuit 912 is supplied with the gate power voltage from the gate power circuit 10, and is configured by an amplifier circuit by connecting a resistor and a transistor in series. The output of the buffer circuit is connected to a gate terminal of the switching element 81 as a drive signal. With this configuration, in a normal state where the gate power circuit 10 normally operates, the drive signal is output from the gate drive circuit 91 according to the PWM signal P1 from the controller 6 so as to control the driving of the switching element 81. In addition, the drive circuit 911 detects a gate power voltage value P3 of the gate power circuit 10. The drive circuit 911 outputs a signal P4 to the controller 6 in a case where the gate power voltage is equal to or less than a voltage not enough to drive the switching element 81 due to a failure of the gate power circuit 10. Further, while not illustrated in the drawing, the gate power circuit 10 is configured by a flyback converter for example.

The battery circuit 93 is connected to the controller 6 through the power supply circuit 92. The power supply circuit is a photovoltaic coupler which is configured by light-emitting and light-receiving diodes, and is connected to a signal line S1 which is output from the controller 6. A power source LV is connected to the signal line S1 through a resistor R1. The resistor R1 is a resistor for limiting a current flowing from the power source LV.

The photovoltaic coupler of the power supply circuit 92 flows a current from the power source LV to the light-emitting diode of the photovoltaic coupler through the resistor R1 when the signal from the controller 6 is supplied, and transfers the photo signal to the light-receiving photo diode. The light-receiving diode receives the photo signal, causes a voltage between anode and cathode of the light-receiving diode using a photoelectric effect to supply the current.

The battery circuit 93 is configured such that a capacitor C1 is connected in parallel through a diode D1, and the diode D1, a MOS transistor (MOSFET) T1, and a diode D3 are connected in series. The battery circuit 93 is connected to the gate electrode of the switching element 81. In the connection line of the diode D1 and the MOS transistor T1, the output line of the signal P2 of the drive circuit 911 is connected through a diode D2. The capacitor C1 stores charges for charging the gate electrode of the switching element 81. The capacitance of the capacitor C1 is set on the basis of a charge quantity required to make the switching element 81 turned on. The diode D1 restricts the charges from flowing in a direction from the photovoltaic coupler (the power supply circuit 92) to the capacitor C1. The diode D2 restricts the charges from flowing in a direction from the drive circuit 911 to the capacitor C1. The diode D3 restricts the charges from flowing in a direction from the capacitor C1 to the gate electrode of the switching element 81. The MOS transistor T1 blocks the flow of the current such that the charges accumulated in the capacitor C1 are not charged to the gate electrode of the switching element 81 except when the gate power circuit 10 is abnormal. In FIG. 3, the gate drive circuit 91, the power supply circuit 92, and the battery circuit 93 corresponding to one switching element 81 are illustrated. The gate drive circuit 91, the power supply circuit 92, and the battery circuit 93 are provided in correspondence with each of six switching elements 81 as illustrated in FIG. 3.

Next, the operation of the power conversion device 1 according to this embodiment will be described with reference to FIGS. 1 to 3. The power conversion device 1 supplies the PWM signal P1 from the controller 6 to the gate drive circuit 91 in a normal operation, drives the switching element 81 through the buffer circuit 912, converts a DC power of the battery 2 into an AC power, and drives the motor generator 3. At this time, the capacitor C1 in the battery circuit 93 is charged with the charges transferred from the drive circuit 911 through the diode D2 by the PWM signal P1. Further, while not illustrated in the drawing, the PWM signal P1 is generated on the basis of the gate power voltage supplied from the gate power circuit 10. In other words, the charges are accumulated to the capacitor C1 by the gate power voltage supplied from the gate power circuit 10. Further, the charges may be directly accumulated to the capacitor C1 through the diode D2 from the gate power circuit 10 regardless of the PWM signal P1. With this configuration, the charges accumulated in the capacitor C1 are blocked by the MOS transistor T1, and thus not charged toward the gate electrode of the switching element 81, and do not hinder the driving of the switching element 81 at a normal time.

The drive circuit 911 monitors soundness of the gate power circuit 10. When the voltage value P3 is less than a predetermined threshold, the drive circuit determines that there is an abnormality in the gate power circuit 10, and outputs the signal P4 to the controller 6. After receiving the signal P4, the controller 6 outputs a signal to the signal line S1 to operate the photovoltaic coupler of the power supply circuit 92. Then, the MOS transistor T1 in the battery circuit 93 enters a conduction state. The charges accumulated in the capacitor C1 are immediately supplied to the gate electrode of the switching element 81 to turn on the switching element 81. In addition, the capacitor C1 is charged by a voltage supplied from the photovoltaic coupler and enters a charged state. In this way, the battery circuit 93 turns on the switching elements 81 of all the phases of the upper arm or the switching elements 81 of all the phases of the lower arm in a case where the gate power circuit 10 is in an abnormal state.

With the above operations, even in a case where a failure occurs in the gate power circuit 10, all the phases of the upper arm or the lower arm of the inverter circuit 8 are turned on to cause the motor generator 3 to be shifted to the 3-phase short mode. Further, the description has been given about an example that the gate power circuit 10 integrally supplies the gate power voltage to all the switching elements 81. However, the gate power circuit 10 may be configured to be dispersed for each of three phases. In addition, an IGBT has been exemplified as the switching element 81, but a MOSFET or a bipolar transistor may be used. Further, a photovoltaic coupler has been exemplified as the power supply circuit 92. However, the power supply circuit 92 may be configured by an insulating-type power source circuit having a structure simpler than the flyback converter. Further, the description has been given about an example in which the switching element 81 is driven using the buffer circuit 912. However, the switching element 81 may be directly driven only by the gate driver IC without the buffer circuit 912.

According to the above-described embodiment, the following operational effects are achieved.

(1) The power conversion device 1 includes the inverter circuit 8 which is configured by the switching element 81, inputs a DC voltage, and outputs an AC voltage, the gate drive circuit 91 which outputs the drive signal to drive the switching element 81, the gate power circuit 10 which supplies the gate power voltage to the gate drive circuit 91 to output the drive signal, and the battery circuit 93 which accumulates charges to turn on the switching element 81. The battery circuit 93 accumulates the charges by the gate power voltage in a case where the gate power circuit 10 is in a normal state. The battery circuit 93 supplies the charges to the switching element 81 to turn on the switching element 81 in a case where the gate power circuit 10 is in an abnormal state. With this configuration, it is possible to provide a power conversion device which can cope with a loss of the power source voltage without complicating a circuit configuration.

While various embodiments and modifications have been described above, the present invention is not limited to these contents. Other aspects which may be considered as falling within technical ideas of the invention shall be included in the scope of the present invention.

REFERENCE SIGNS LIST 1 power conversion device
2 battery
3 motor generator
4 capacitor
5 contactor
6 controller
7 current sensor
8 inverter circuit
9 gate control circuit
10 gate power circuit
81 switching element
91 gate drive circuit
92 power supply circuit
93 battery circuit

The invention claimed is:

1. A power conversion device, comprising:
an inverter circuit which is configured by a switching element, inputs a DC voltage, and outputs an AC voltage;
a gate drive circuit which outputs a drive signal to drive the switching element;
a gate power circuit which supplies a gate power voltage to the gate drive circuit to output the drive signal; and
an accumulation circuit, which is connected to the gate drive circuit, and which accumulates charges to turn on the switching element,
wherein the accumulation circuit receives an output from the gate drive circuit and
wherein the accumulation circuit accumulates the charges by the gate power voltage in a case where the gate power circuit is in a normal state, and supplies the charges to the switching element to turn on the switching element in a case where the gate power circuit is in an abnormal state.

2. The power conversion device according to claim 1, wherein the accumulation circuit turns on the switching elements of all phases of an upper arm or the switching elements of all phases of a lower arm in a case where the gate power circuit is in the abnormal state.

3. The power conversion device according to claim 1, further comprising:
a power supply circuit which supplies a voltage to the accumulation circuit,
wherein the accumulation circuit accumulates the charges by a voltage supplied from the power supply circuit in a case where the gate power circuit is in the abnormal state.

4. The power conversion device according to claim 1, wherein the accumulation circuit includes a blocking circuit which blocks the charges from being supplied, and
wherein the blocking circuit blocks the charges in a case where the gate power circuit is in the normal state so as not to supply the charges to the switching element.

5. The power conversion device according to claim 1, wherein the accumulation circuit includes a capacitor which accumulates the charges, and
wherein a capacitance of the capacitor is set on the basis of a gate charge quantity required to turn the switching element on.

6. The power conversion device according to claim 1, further comprising:
a photovoltaic coupler which supplies power to the accumulation circuit.

7. The power conversion device according to claim 1, wherein the gate drive circuit and the accumulation circuit are configured to be disposed within a gate control circuit.

8. The power conversion device according to claim 1, wherein the gate drive circuit monitors a voltage associated with the gate power circuit.

9. The power conversion device according to claim 8, wherein the gate drive determines the abnormal state based on the monitored voltage.

10. A method for coping with a loss of power source voltage by a power conversion device, the method comprising:
- converting, by an inverter circuit, an input DC voltage to an output AC voltage;
- wherein the inverter circuit is configured by a switching element;
- outputting, by a gate drive circuit in communication with the inverter circuit, a drive signal to drive the switching element;
- supplying, by a gate power circuit connected to the gate drive circuit, a gate power voltage to output the drive signal; and
- accumulating, by an accumulation circuit including a capacitor connected to the gate drive circuit, a plurality of charges by the gate power voltage in a case where the gate power circuit is in a normal state;
- receiving, by the accumulation circuit, an output from the gate drive circuit; and
- supplying, by the accumulation circuit, the plurality of charges to the switching element to turn on the switching element in a case where the gate power circuit is in an abnormal state.

11. The method of claim 10, wherein a capacitance of the capacitor is set on the basis of a gate charge quantity required to turn on the switching element.

\* \* \* \* \*